United States Patent [19]
Yoo et al.

[11] Patent Number: 5,324,702
[45] Date of Patent: Jun. 28, 1994

[54] CATALYTIC OXIDATION AND OXIDATIVE DEHYDROGENATION USING METAL-COMPOUND-LOADED, DEBORONATED HAMS-1B CRYSTALLINE BOROSILICATE MOLECULAR SIEVE COMPOSITIONS

[75] Inventors: Jin S. Yoo, Flossmoor; Mark S. Kleefisch, Naperville; John A. Donohue, Elmhurst, all of Ill.

[73] Assignee: Amoco Corporation, Chicago, Ill.

[21] Appl. No.: 991,113

[22] Filed: Dec. 16, 1992

Related U.S. Application Data

[63] Continuation-in-part of Ser. No. 796,470, Nov. 22, 1991, abandoned.

[51] Int. Cl.$^5$ .......................... B01J 21/00; B01J 37/00
[52] U.S. Cl. ..................................... 502/204; 502/205; 502/206; 502/207
[58] Field of Search ................ 502/206, 207, 204, 205

[56] References Cited
U.S. PATENT DOCUMENTS

| | | | |
|---|---|---|---|
| 4,268,420 | 5/1981 | Klotz | 502/206 |
| 4,451,685 | 5/1984 | Nevitt et al. | 502/206 |
| 4,462,971 | 7/1984 | Hinnenkamp et al. | 502/206 |
| 4,725,570 | 2/1988 | Sikkenga et al. | 502/207 |

*Primary Examiner*—Carl F. Dees
*Attorney, Agent, or Firm*—Thomas E. Nemo; Wallace L. Oliver

[57] ABSTRACT

Compositions comprising certain metal-containing materials distributed interactively on a deboronated HAMS-1B crystalline borosilicate molecular sieve which are useful for catalytically oxidizing or oxidatively dehydrogenating organic compounds such as alkanes, aromatics, and alkyl-substituted aromatics are described. Alkanes are oxidatively dehydrogenated to olefins, and an aromatic compound such as benzene can be oxidized by nitric and/or nitrous oxide to largely phenol or largely nitrobenzene depending upon the oxidation temperature. When the compound is a methylaromatic, oxidation produces an aromatic aldehyde. Alkyl groups larger than methyl oxidatively dehydrogenate to alkenyl groups. The compositions can be used in a process to separate p-xylene from a mixture of its isomers based upon the ability of the compositions, which preferably comprise a iron molybdenum material interactively distributed on a deboronated HAMS-1B crystalline borosilicate molecular sieve, to selectively oxidize the p-xylene to an aldehyde or dialdehyde while not substantially oxidizing the ortho and metaxylene isomers. Such partially oxidized mixtures of p-xylene are useful to make TPAA or as feeds to a water-based, further oxidation to make terephthalic acid. Carbon dioxide used as a carrier gas with a methylaromatic feed to the oxidation catalyst is shown to have a beneficial effect on yield and selectivity.

5 Claims, No Drawings

CATALYTIC OXIDATION AND OXIDATIVE DEHYDROGENATION USING METAL-COMPOUND-LOADED, DEBORONATED HAMS-1B CRYSTALLINE BOROSILICATE MOLECULAR SIEVE COMPOSITIONS

CROSS-REFERENCE TO RELATED APPLICATION

This application is a continuation-in-part of application Ser. No. 07/796,470 filed Nov. 22, 1991 and now abandoned, the specifications and claims of which are incorporated by reference herein.

BACKGROUND OF THE INVENTION

This invention relates to compositions containing a pair of metal compounds distributed interactively on a deboronated HAMS-1B crystalline borosilicate molecular sieve (DBH) and a process of using such compositions as oxidation or oxidative dehydrogenation catalysts. More particularly, this invention relates to an improved process and composition for the alkyl group oxidation or oxidative dehydrogenation of an alkyl-substituted aromatic using a novel metal-compound-containing composition based upon a deboronated HAMS-1B crystalline borosilicate molecular sieve. Still more particularly, this invention relates to improved process for the methyl group oxidation of a methyl-substituted aromatic, such as p-xylene, to an aromatic mono and/or dialdehyde using a catalytic amount of a novel composition containing an iron molybdenum material distributed interactively on a deboronated HAMS-1B crystalline borosilicate molecular sieve.

U.S. Pat. No. 3,597,485 discloses a process for preparation of terephthalaldehyde (referred to herein as TPAA) which comprises subjecting p-xylene to a vapor phase oxidation in the presence of a catalyst mixture consisting of tungsten and molybdenum compounds.

U.S. Pat. No. 3,845,137 describes a process for preparation of TPAA in which p-xylene is oxidized in the vapor phase in the presence of a supported catalyst mixture of oxides of tungsten and molybdenum and at least a third metal or oxide selected from the group consisting of calcium, barium, titanium, zirconium, hafnium, thallium, niobium, zinc, and tin. According to this patent, the three component catalyst composition processes have improved catalyst life when compared to the catalyst described in U.S. Pat. No. 3,597,485. However, in both of these patents the conversion of p-xylene to TPAA is low.

U.S. Pat. No. 4,017,547 describes an improved process for making TPAA which uses a mixture of molybdenum oxide and silico-tungstic acid in combination with bismuth oxide. Catalyst lifetime and conversion to TPAA are both said to be improved over the prior art techniques. Not only is the conversion of p-xylene to TPAA said to be increased substantially by the use of the oxide of bismuth, but catalyst life is also said to be improved considerably, thereby permitting the operation of the oxidation process for longer periods of time before catalyst regeneration is required.

In an article entitled "Polymer Applications of Some Terephthalaldehyde Derivatives" in *Ind. & Eng. Chem., Prod. Res. Dev.* 15 (1) 83–88(1976), the authors use a tungsten-molybdenum catalyst in a ratio of about 9:1 deposited in an amount of ten percent or less on an alumina support to oxidize a mixture of air and p-xylene at 475° C. to 575° C. to a mixture of tolualdehyde (TAL) and TPAA. A 40–60% yield of TPAA with a minor production of byproducts is reported. The lifetime of the catalyst however appears to be poor.

Two catalyst properties are of primary importance for the operation of a continuous oxidation or oxidative dehydrogenation process which converts alkanes, aromatics or alkyl aromatics on a commercial scale. The first is yield of the desired oxidation product and the second is catalyst lifetime.

Now it has been discovered that metal-compound-containing compositions based on a deboronated HAMS-1B crystalline borosilicate molecular sieve having the MFI crystal structure can be very selective in oxidation and oxidative dehydrogenation reactions while having a long lifetime. For example, the alkyl group oxidation of an alkyl-substituted aromatic in the presence of a catalytic amount of a composition which is an iron molybdenum material distributed interactively on a deboronated HAMS-1B crystalline molecular sieve can yield aromatic aldehydes where the alkyl substituent is methyl and alkenyl-substituted aromatics when the alkyl substituent is larger than methyl. (oxidative dehydrogenation). The compositions give a combination of both good yield and good catalyst lifetime for the production of aromatic aldehydes or alkenyl aromatic products with reduced amounts of burning to fully oxidized products. In addition, the compositions show a selectivity in the oxidation of xylene and dialdehydes which can serve as the basis for a process for separating p-xylene from the other xylene isomers by selectively oxidizing p-xylene. Products of such selective p-xylene and dialdehyde oxidation are suitable intermediates for a variety of novel and specialty polymer applications including liquid crystals, engineering polymers, and optical brighteners. These oxidation products are also useful in synthesis of alcohols such as cyclohexanedimethanol. A particularly useful product of this invention is p-tolualdehyde which is useful as a feed to a water-based oxidation process to make purified terephthalic acid.

SUMMARY OF THE INVENTION

In one aspect, the invention is a composition comprising a minor amount of a material made from a first component which is a volatile compound of a element selected from the group consisting of Fe(III), Zn(II), Zr(IV), Nb(V), In(III), Sn(IV), Sb(V), Ce(III) and Bi(III) and a second component which is a volatile compound of an element selected from the group consisting of Mo(VI), W(VI) and V(V) which first and second components are interactively distributed on a major amount of deboronated HAMS-1B crystalline borosilicate molecular sieve containing less than about 0.1 wt % of boron as the element. Advantageously, total metals in the minor amount of material is in a range form about 0.5 to about 15 weight percent of the total weight of the composition.

Preferred compositions include minor amount of a material consisting of a first component which is a compound of an element selected from the group consisting of Fe(III), Zn(IV), Sb(V), and Bi(III), and a second component which is a compound of an element selected from the group consisting of Mo(VI) and W(VI).

In a second aspect, the invention described herein is a composition comprising a minor amount of iron molybdenum material with an atomic ratio of molybdenum to iron in a range from about 1.5 to about 2.5 distributed on a major amount of deboronated HAMS-1B crystalline borosilicate molecular sieve containing less than about 0.05 wt % as the element of boron.

In another aspect, the invention embraces a methyl-group oxidation process comprising combining a feed containing a methyl aromatic compound with an oxygen-affording substance at oxidation conditions over a composition comprising a minor amount of an iron molybdenum material with an atomic ratio of molybdenum to iron in a range from about 1.5 to about 2.5 distributed on a major amount of deboronated HAMS-1B crystalline borosilicate molecular sieve containing less than about 0.1 wt % as the element of boron.

In still another aspect, the invention embraces a composition made by a process comprising:

depositing an iron compound on a HAMS-1B crystalline borosilicate molecular sieve containing at least about 0.4 wt % as the element of boron or a predeboronated HAMS-1B crystalline borosilicate molecular sieve containing less than about 0.1 wt % as the element of boron from the vapor phase to form an iron-containing deboronated HAMS-1B crystalline borosilicate molecular sieve;

washing and drying said iron-containing deboronated HAMS-1B crystalline borosilicate molecular sieve;

depositing a molybdenum compound on said washed and dried iron-containing deboronated HAMS-1B crystalline borosilicate molecular sieve from the vapor phase to form an iron-molybdenum-containing deboronated HAMS-1B crystalline borosilicate molecular sieve; and heating said iron-molybdenum-containing deboronated HAMS-1B crystalline borosilicate molecular sieve to form a composition comprising a minor amount of an iron molybdenum material having an atomic ratio of molybdenum to iron in a range from about 1.5 to about 2.5 distributed on a major amount of deboronated HAMS-1B crystalline borosilicate molecular sieve containing less than about 0.1 wt % as the element of boron.

In still another aspect the invention is a separation process for a feed comprising primarily xylenes including p-xylene comprising:

contacting said feed in an oxidation stage at oxidation conditions with an oxygen-affording substance over a composition comprising a minor amount of iron molybdenum material having a molybdenum to iron ratio between about 1.5 and about 2.5 distributed on a major amount of deboronated HAMS-1B crystalline borosilicate molecular sieve containing less than about 0.1 wt % as the element of boron to form an oxidized product;

separating said oxidized product into a primarily aromatic aldehyde-containing product and a primarily xylene-containing product;

sending said primarily xylene-containing product to an isomerization stage; and recycling the isomerized product of said isomerization stage to said oxidation stage.

In still another aspect the invention is an oxidative dehydrogenation process comprising combining a feed containing at least one $C_2$ to $C_5$ alkyl aromatic and/or $C_2$ to $C_6$ alkane hydrocarbon compound with an oxygen-affording substance at oxidative dehydrogenation conditions over a composition comprising a minor amount of an iron molybdenum material having an atomic ratio of molybdenum to iron in a range from about 1.5 to about 2.5 distributed on a major amount of deboronated HAMS-1B crystalline borosilicate molecular sieve containing less than about 0.1 wt % as the element of boron to form a $C_2$ to $C_5$ alkenyl aromatic compound and/or $C_2$ to $C_6$ alkene hydrocarbon compound. Typically, oxidative dehydrogenation is carried out at temperatures above about 225° C., preferably in a range from about 250° C. to about 550° C.

In a still further aspect the invention is a process comprising combining a benzene feed with nitric acid or nitrous oxide at oxidizing conditions above about 350° C. over a composition comprising a minor amount of a material made from a first component which is a volatile compound of an element selected from the group consisting of Fe(III), Zn(II), Zr(IV), Nb(V), In(III), Sn(IV), Sb(V), Ce(III) and Bi(III), and a second component selected from the group consisting of Mo(VI), W(VI) and V(V), which first and second components are interactively distributed by vapor deposition on a major amount of deboronated HAMS1-B crystalline borosilicate molecular sieve containing less than about 0.1 wt % as the element of boron to form primarily phenol.

In a still further aspect, the invention is a crystalline borosilicate molecular sieve containing some lattice boron but less than about 0.05 wt % and more than about 20 wt % silanol groups.

DETAILED DESCRIPTION OF THE INVENTION

The compositions of this invention may be made directly from a AMS-1B crystalline borosilicate molecular sieve in the hydrogen form, HAMS-1B, or indirectly from a deboronated variation of such sieve. The preparation of such a sieve is set out in detail in U.S. Pat. Nos. 4,268,420; 4,269,813; and 4,285,919. A description of a particularly useful, essentially sodium-free variant of HAMS-1B molecular sieve may be found in U.S. Patent No. 5,053,211. All of such patents are specifically incorporated herein by reference. Such HAMS-1B sieves contain characteristically between about 0.4 and about 1.1 wt % of lattice boron (about 2% of total boron) measured as the element. However, they may have a larger total boron content as not all the boron need be present as lattice boron.

In the direct procedure described below for making deboronated sieve, the HAMS-1B sieve is first preferably aqueous ammonia exchanged and then calcined between about 300° C. and 700° C. for a short period of time before deposition of the metal compounds from the vapor phase. Only a small loss of boron is noted in this preliminary aqueous exchange and subsequent heating. If the deboronated sieve is made indirectly (predeboronated HAMS-1B sieve) as is also described below, it may also be calcined in the same temperature range before extracting the boron and depositing the metal compounds from the vapor phase.

The deboronated HAMS-1B crystalline borosilicate molecular sieve of the invention may be made directly, and preferably, by depositing the metal compounds from the vapor state on HAMS-1B sieve, a process which is involved in reducing the lattice boron content of the sieve during the deposition process. The boron can then be water extracted from the sieve. The sieve can also be made indirectly by extracting a HAMS-1B sieve with deionized hot water or dilute acid prior to vapor deposition of the metals. Preferably, the boron content of the sieve is reduced to less than about 0.01 wt as the element, more preferably, less than about 0.05 wt %, and most preferably, less than about 0.02 wt %, when the deboronated sieve is made using either method. Made by either method, a small amount of boron remains in the sieve along with some aluminum present as an impurity.

The sieve retains the MFI structure of the original HAMS-1B sieve and may be considered a high-silanol-containing silicalite. It is believed that when the boron atoms are removed from the HAMS-1B sieve after the vapor deposition process or the aqueous deboronation process, silanol-rich reactive sites are left behind which are able to capture effectively the metal compounds to form interactively catalytically active sites. The silanol content of the deboronated HAMS-1B crystalline borosilicate molecular sieve prior to vapor deposition, as determined by magic angle spinning NMR, is preferably above about 15 wt %, more preferably, above about 18 wt %, and most preferably, above about 20 wt % of the total weight of the silicon atoms present in the sample. Weight percent silanol in a sample is determined by the ratio of the area under the peak corresponding to the $HOSi(OSi)_3$ NMR signal to the total areas of the peaks corresponding to the $Si(OSi)_4$ and $HOSi(OH)_3$ signals.

Metal ions whose volatile compounds are particularly useful in making the metal materials of this invention include Fe(III), Bi(III), Zr(IV), Sn(IV) and Sb(V) as the first component. As the second component, the metals whose compounds are particularly useful include Mo(VI), W(VI) and V(V). After vapor depositing the two metal components on the sieve, the result is heated to interact the compounds with each other and the sieve. Depending upon the nature of the first and second component, it may be desirable to switch the order of their depositing on the sieve. For example, preferred Fe-Mo-DBH catalysts are obtained by distribution of an iron compound followed by molybdenum compounds, however, preferred Sb-Mo-DBH catalysts are obtained by distribution of an molybdenum compound followed by antimony compounds.

The preferred combination of metal compounds forms an iron molybdenum material which is made by vapor-depositing a volatile iron compound on the sieve followed by vapor-depositing a volatile molybdenum compound on the sieve and calcining the result to promote the interaction of the iron and molybdenum compounds with each other and the sieve.

The process for making the catalytic compositions of the invention is illustrated below using the preparation of a Fe-Mo-DBH composition. In preparing the iron molybdenum material deboronated HAMS-1B composition, the aqueous exchanged and calcined HAMS-1B sieve or calcined, predeboronated HAMS-1B sieve is treated with a volatile iron compound such as iron (III) chloride to deposit the iron compound on the sieve. The amount of iron compound deposited on the surface of the sieve depends on the amount of iron molybdenum material desired in the final composition. Preferably, the iron-containing sieve is then washed to remove boron and chlorine, and then it is calcined at a temperature between about 200° C. and 400° C. It has been found particularly advantageous to the catalytic properties of the compositions to vapor-deposit the iron compound on the sieve prior to vapor deposition of the molybdenum compound.

The iron-containing sieve is then treated with a volatile molybdenum compound such as $MoO_2Cl_2$, $MoOCl_4$, $MoCl_5$, etc. to vapor deposit the molybdenum compound on the sieve. Care should be taken to lay down an amount of molybdenum to provide an atomic ratio molybdenum to iron in a range upward from 1.5 which roughly corresponding to the stoichiomety of the formula of iron molybdate, $Fe_2(MoO_4)_3$. Another calcination carried out at temperatures in a range from about 300° C. to about 700° C. is believed to promote interactions of iron and molybdenum compounds, with each other and the sieve, to form primarily iron molybdate. It is preferred not to have an excess of iron over that corresponding to the iron molybdate formula given above, as the presence of excess of iron appears to produce more hydrocarbon burning during use of the composition as an catalyst. The major amount of the iron molybdenum material seems to be in the form of finely divided iron molybdate, $Fe_2(MoO_4)_3$, and molybdenum trioxide, $MoO_3$. It is preferred to have an excess of molybdenum over that required for the iron molybdate formula of 3 molybdenum atoms for each 2 Fe atoms. Preferably, the molybdenum to iron atomic ratio of the deboronated HAMS-1B compositions lies between about 1.5 to about 2.5, more preferably, between about 1.6 and 2.4, and most preferably between about 1.6 and 2.3.

More generally, the atom ratio of the second component metal to the first component metal of the metal material on the deboronated HAMS1-B crystalline borosilicate molecular sieve is about 0.2 to 1 to about 3 to 1, more preferably, it is about 0.5 to 1 to about 2.5 to 1, and most preferably, it is about 1 to 1 to about 2.5 to 1.

Generally, the total metals content of the interacted metal materials on the deboronated sieves should be between about 0.5 and about 20 wt % of the total composition. More specifically, the total metals in the iron molybdenum material distributed on the deboronated HAMS-1B sieve is desirably between about 0.5 and about 15 wt % based on the total composition weight. More preferably, the total metals in the iron molybdenum material distributed on the deboronated HAMS-1B sieve lies between about 1 and about 12 wt %, and most preferably, the total metals in the iron molybdenum material distributed on the sieve lies between about 2 and about 10 wt %.

The oxidants useful in this invention for oxidation and oxidative dehydrogenation are oxygen-affording substances such as air or mixtures of oxygen with other gases such as nitrogen, argon, helium, carbon dioxide, and the like. Use of carbon dioxide, as a carrier gas and/or oxygen-affording substance alone or in combination with additional oxygen-affording substances, appears to promote the conversion and selectivity of the oxidation of p-xylene to aldehyde products and also suppress substrate burning. Nitric acid and nitrous oxide are also useful as oxidants for benzene in this invention.

The compositions of this invention are particularly useful as oxidation and oxidative dehydrogenation catalysts, more particularly for the oxidation of aromatic and methyl aromatic compounds and the oxidative dehydrogenation of alkanes and alkyl aromatics, where the alkyl group is larger than methyl. They can be used with nitric acid or nitrous oxide as oxidants to oxidize benzene to phenol or nitrobenzene, depending upon the reaction temperature. For example, methyl-substituted aromatics such as methyl-naphthalenes, methylbiphenyls and methylbenzenes are conveniently oxidized to aldehydes. Toluene, mixed xylenes and p-xylene are particularly useful feeds. In the case of p-xylene, for example, both p-tolualdehyde (TAL) and TPAA are formed. The compositions are also useful in oxidizing ethylaromatics selected from the group consisting of

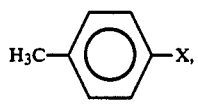

in which X is H, OCH₃, NO₂, OH, F, Cl, Br, COOH, COCl, R, COOR and COR where R is a $C_1$ to $C_4$ alkyl group. The products of the oxidation are aldehydes.

The compositions may also be used to oxidatively dehydrogenate alkanes, or mixtures of alkanes, such as ethane, propane, butane, isobutane, pentane, hexane and the like to the corresponding olefin or olefins, and $C_2$-$C_5$ alkyl aromatics to aromatic alkenyl derivatives. The t-butyl group of course is not included as it is not subject to partial oxidation to an alkenyl group. For example, ethane is oxidatively dehydrogenated to ethylene, ethylbenzene is oxidatively dehydrogenated to styrene, p-diethylbenzene to divinylbenzene, and cumene is converted to isopropenylbenzene.

It has been found the Fe-Mo-DBH compositions of this invention are poor at catalyzing the oxidation of o-xylene and m-xylene to their respective aldehydes and dialdehydes whereas the compositions are quite effective in catalyzing the oxidation of p-xylene to its respective aldehyde and dialdehyde. This difference believed to be a unique property of the Fe-Mo-DBH compositions of this invention which may, in part, be the result of the pore structure of the deboronated HAMS-1B sieve, allows the oxidation process to be used to effect a separation of the isomers of xylene or mixtures of xylene isomers with other hydrocarbons such as ethylbenzene, and $C_9$ paraffins and naphthenes by preferentially forming para-tolualdehyde and TPAA from the p-xylene. Ethylbenzene can be oxidatively dehydrogenated in the process to styrene. Reaction conditions of oxidation over Fe-Mo-DBH compositions of this invention can readily be selected to limit dehydrogenation reaction of ethylbenzene. The mixture of aldehydes is easily separated from the unreacted xylenes by distillation, for example, and can be further purified to remove the small amount of the aldehydes and dialdehydes of o-xylene and m-xylene which are formed in the oxidation process. The purified mixture of p-tolualdehyde and TPAA can then be used to make pure TPAA or as intermediate for various applications described herein above, for example, advantageously as a feed to a water-based oxidation process for the preparation of terephthalic acid. The unreacted xylenes from the oxidation stage after separation from the aldehydes can be recycled to the alkyl group oxidation unit after first being isomerized in a unit in which the amount of p-xylene is augmented. In this manner, a feed of mixed xylenes can be continuously converted to p-xylene oxidation products to form TPAA or to form an appropriate feed for a water-based procedure for the preparation of terephthalic acid. The details of a similar process using a cobalt boron and oxygen catalyst to partially oxidize p-xylene and the use of the p-xylene oxidation products in a water-based terephthalic acid process is taught in U.S. Pat. No. 4,863,888 which is specifically incorporated herein by reference.

The Fe-Mo-DBH compositions are also useful for the vapor or liquid phase oxidation of benzene using nitric acid or nitrous oxide as the oxidant. With these oxidants the product of the reaction is temperature sensitive. Above about 350° C. the oxidation produces primarily phenol, and below about 400° C. the oxidation produces primarily nitrobenzene.

The metal compound material distributed on deboronated HAMS-1B crystalline borosilicate molecular sieve compositions useful in this invention can be admixed with, or incorporated in, a silica or other oxide, such as alumina, silica-alumina, thoria, titania, magnesia, a spinel, a perovskite, bentonite and the like, as a binder. Preferably, a support which is neutral to weakly basic or weakly acidic is desirable. Typically, the compositions are incorporated within the binder by blending with a sol of the oxide material and gelling the resulting mixture. These supported compositions are then dried at temperatures in a range from about 100° C. to about 200° C. and thereafter generally calcined at temperatures in a range from about 500° C. to about 700° C.

If supported, the iron-molybdenum-material-loaded deboronated HAMS-1B sieve (Fe-Mo-DBH) content of the supported compositions can vary anywhere from about 5 to about 60 wt % of the total supported composition. Preferably, they form about 10 to about 60 wt % of the total supported composition, and more preferably, form about 10 to about 40 wt % of the total supported composition.

Oxidation or oxidative dehydrogenation in the presence of the above-described compositions is effected by contact of the organic compound either in the liquid or vapor phase at temperatures ranging from about 50° C. to about 1000° C. Generally, an oxygen-containing gas is used as the oxidant. Air can be used or synthetic mixture of an inert or other gas and the oxygen level adjusted to the desired amount. The reaction takes place at atmospheric pressure, but the pressure may be within the range of about 0 psig to about 2000 psig. Reaction is suitably accomplished using a weight hourly space velocity of between about 0.01 $hr^{-1}$ and about 100 $hr^{-1}$. For some compounds reaction in the liquid phase is preferred. Reactions in the liquid phase typically are carried out at temperatures in a range from about 50° C. to about 300° C., preferably from about 100° C. to about 260° C. and most preferably from about 100° C. to about 200° C., with pressures in a range from about 0 to about 300 psig, preferably from about 60 psig to about 250 psig at space velocities in a range from about 0.02 $hr^{-1}$ to about 5 $hr^{-1}$, preferably from about 0.08 $hr^{-1}$ to about 2 $hr^{-1}$. Liquid phase reactions can be carried out in a trickle bed configuration, catalytic distillation configuration or slurry bed configuration, for example. In the gas phase, reactions typically are carried out at temperatures in a range from about 250° C. to about 1000° C., preferably from about 300° C. to about 600° C. and most preferably from about 400° C. to about 550° C., with pressures in a range from about 0 to about 300 psig, and space velocities in a range from about 0.01 $hr^{-1}$ to about 100 $hr^{-1}$, preferably from about 0.5 $hr^{-1}$ to about 50 $hr^{-1}$. Gas-phase reactions can be carried out in a fluid bed, stirred bed, fixed bed or other suitable reactor configuration.

Heat generated in the highly exothermic liquid-phase partial oxidation is typically dissipated at least partially by vaporization of unreacted aromatic reactant and, if used, solvent, in the partial oxidation reactor. The resulting vapor and excess oxygen-containing gas are withdrawn from the partial oxidation reactor through a vent above the liquid level in the partial oxidation reactor. The withdrawn aromatic reactant is then condensed in a condenser and recycled to the partial oxidation reactor The oxidation or oxidative dehydrogenation of the method of this invention can be performed in either a batch or semi-continuous mode. In the batch mode, the aforesaid aromatic reactant, catalyst and, if used, solvent are initially introduced batchwise into the reactor, and the temperature and pressure of the reactor contents are then raised to the desired levels therefor for the commencement of the oxidation reaction. An oxygen-containing gas or vapor is introduced continuously into the reactor. After commencement of the oxidation reaction, the temperature of the reactor contents is raised to the desired reaction temperature. In the semi-continuous mode, the catalyst and, if used, solvent are initially introduced batchwise into the reactor, and then the aromatic reactant and air are introduced continuously into the reactor. After commencement of the oxidation reaction, the temperature of the reactor contents is raised to the desired reaction temperature. Preferably, the continuous mode is employed for the vapor or liquid phase oxidation or oxidative dehydrogenation method of this invention.

If the partial oxidation of the method of this invention is performed semicontinuously, the space velocity in the range of from about 0.02 $hr^{-1}$, preferably from about 0.08 $hr^{-1}$, to about 5 $hr^{-1}$, preferably to about 2 parts of the aromatic reactant per part of the catalyst particles by weight per hour is employed. If the partial oxidation of the method of this invention is performed batchwise, the aromatic reactant and catalyst are mixed in a weight ratio in the range of from about 250, preferably from about 1000, to about 10,000, preferably to about 4000 parts of aromatic feed per part of catalyst by weight, and the reaction time is in the range of from about 0.5, preferably from about 1, to about 20, preferably to about 4 hours.

The resulting partially oxidized liquid aromatic product can then be separated from the solid catalyst particles by any convenient solid-liquid separation. The aromatic product can also be separated from any unreacted aromatic reactant by any convenient liquid-liquid separation, such as distillation, by any convenient gas-liquid separation if the unreacted aromatic reactant has been vaporized or by any convenient solid-liquid separation if the temperature is lowered to a point where the partially oxidized aromatic product but not the aromatic reactant crystallizes.

An especially convenient means of both effecting the partial oxidation and separating the partially oxidized, aromatic product from both the catalyst and unreacted aromatic reactant involves catalytic distillation. In such a system, a distillation column in the partial oxidation reactor is packed with a bed of the solid heterogeneous catalyst and is heated to a temperature in the range of suitable reaction temperatures for the partial oxidation. In addition, at least the bottom region of the catalyst bed is maintained at the temperature of at least the boiling point of the aromatic reactant and at least the melting point of the partially oxidized aromatic product but below the boiling point of the partially oxidized, aromatic product, at the pressure employed in the column. Liquid aromatic reactant is introduced to the top of the column and passes downwardly through the column. An oxygen-containing gas is introduced into the bottom of the column and flows upward through the column. The liquid aromatic reactant and oxygen react to form the partially oxidized aromatic product which flows as a liquid downward through the column. Any remaining unreacted aromatic feed continues to flow downward through the column until it vaporizes in the bottom region thereof and then flows upward through the column in the stream of oxygen-containing gas.

Thus, substantially only partially oxidized, aromatic product passes downward out of the column as a liquid and thereby is separated from both the solid catalyst and unreacted aromatic reactant even before it is withdrawn from the partial oxidation reactor. The resulting aromatic product withdrawn from the partial oxidation reactor is substantially free of unreacted aromatic reactant and contains preferably less than 10 weight percent, more preferably less than 1 weight percent of unreacted aromatic reactant.

In the alternative, a trickle bed catalyst configuration can be employed, in which case both unreacted aromatic reactant and partially oxidized aromatic product pass as a mixture of liquids out of the catalyst bed. In such case, it would be necessary to separate the unreacted aromatic reactant from the partially oxidized aromatic product.

In a preferred embodiment of this invention, the partially oxidized aromatic product produced from p-xylene or mixed xylenes as described herein above is completely oxidized to its carboxylic acid derivative in at least one additional step. Preferably such complete oxidation to the carboxylic acid derivative occurs in a second reactor using a suitable oxidation catalyst dissolved or suspended in water solution.

The partially oxidized p-xylene, etc., product of the partial oxidation method of the present invention is soluble in water as well as in other common solvents such as low molecular weight carboxylic acids such as acetic acid. Hence, it a preferred embodiment of the method of this invention, the partially oxidized aromatic product is introduced into a second reactor where it is completely oxidized in the liquid phase by an oxygen-containing gas to its corresponding carboxylic acid derivative. Either the partially oxidized product is introduced directly into the second reactor where it dissolves in water or a mixed solvent already in the second reactor, or the partially oxidized aromatic product is first dissolved in water or a mixed solvent and the resulting solution is introduced into the second reactor. In either case, the weight ratio of partially oxidized aromatic product introduced into the second reactor-to-water (or other solvent) is in the range of from about 0.1 preferably from about 0.2, to about 0.4, preferably to about 0.3 parts of the partially oxidized aromatic product per part by weight of water.

The following Examples will serve to illustrate certain specific embodiments of the herein disclosed invention. These Examples should not, however, be construed as limiting the scope of the novel invention as there are many variations which may be made thereon without departing from the spirit of the disclosed invention, as those of skill in the art will recognize.

GENERAL

All the metal-containing deboronated HAMS-1B sieve compositions were pressed into 1⅛ in diameter tablets at 10,000 psig, crushed and sieved to 20/40 mesh size (ASTME-11) for use in testing of catalytic activity.

EXAMPLE 1

Using the indirect method for making DBH, a 427 g amount of HAMS-1B sieve containing 1.5 wt % of boron was stirred with 3.5 L of deionized water for 4 hr. The solid was recovered and washed three times for 4 hr each with deionized water at 90° C. It was then oven-dried at 110° C. overnight yielding 376 g of dried product which contained 0.26 wt % of boron by ICP analysis. The silanol content by $^{29}$Si MAS NMR analysis was 19 wt %. A 10 g sample of the solid was water-extracted using a Soxhlet extractor for 4 days. After oven drying at 110° C. overnight, an 8.6 g amount of solid remained which contained 0.013 wt % of boron by ICP analysis and 21 wt % of silanol groups by $^{29}$Si MAS NMR. The resulting solid was a pre-DBH ready to undergo metal compound deposition to make a metal-compound-containing composition.

EXAMPLE 2

Using the direct method for making DBH, a 350 g sample of HAMS-1B sieve containing about 1.8 wt % of boron was exchanged using an ammonium acetate solution (150 g of ammonium acetate in 3.5 L of water) with stirring at ambient temperature for 30 min. The result was filtered and dried and the exchange procedure repeated twice more. Dried exchanged HAMS-1B sieve was calcined for 4 hr at 540° C. and when analyzed contained 1.18 wt % boron by ICP analysis. Calcination was repeated once more at 600° C. to reduce iron compound pickup in the next step.

Dried and exchanged sieve was again calcined at 400° C. and put in a tube and dry nitrogen containing anhydrous $FeCl_3$ passed over the sieve at 460° C. The sieve was removed from the tube, cooled, heated at 90° C. in deionized water for 1.5 hr, and then filtered and dried. This procedure was repeated twice more. The resulting iron-loaded sieve contained 2.2 wt % of iron and 0.06 wt % of boron by ICP analysis.

Iron-loaded sieve was treated in a process similar to that for iron loading at about 200° C. with $MoO_2Cl_2$ yielding a iron-molybdenum material loaded sieve containing 1.94 wt % Fe and 7.2 wt % Mo. The solid was heated at 650° C. for 8 hr in air to fix molybdenum.

Calcined solid was washed using the wash procedure outlined above, and when analyzed after washing, contained 0.099 wt % B, 2.09 wt % Fe, and 4.9 wt % Mo wt % by ICP analysis (Mo/Fe=1.35). Raman spectra of these catalysts had bands at 1324 cm which were due to $\alpha$-$FeO_3$. Not all of the iron compound reacted with the molybdenum compound to form $Fe_2(MoO_4)_3$.

Catalyst (2 g) was pretreated in a flow of 100 mL/min of 8 vol % $O_2$ in $N_2$ at 650° C. for 16 hr and then cooled to 375° C. In testing this catalyst for oxidation, p-xylene containing feed having an $O_2$/PX molar ratio of 7 was converted at a temperature of 375° C., a WHSV of 0.37 $hr^{-1}$, and contact time of 0.16 sec using a gas flow of 250 mL/min of 8 vol % $O_2$ in $N_2$ mixed with 1250 mL/min of $N_2$. Oxidation results were 58% PX conversion, 27% $CO_2$ selectivity, 18% TAL selectivity, and 49% TPAA selectivity.

Powder X-ray diffraction pattern (XRD) of iron-molybdenum material loaded sieve (Fe-Mo-DBH) showed that the crystal structure of HAMS-1B sieve was maintained, but the pattern had considerably reduced peak intensities. BET surface area remained about that of the starting sieve, 288 $m^2$/g. Micropore volume was 0.114 cc/g. Raman spectra showed peaks at about 784 $cm^{-1}$ and 956 $cm^1$ which were atributed to $Fe_2(MoO_4)_3$., and other peaks at about 670 $cm^{-1}$, 822 $cm^{-1}$, and 998 $cm^{-1}$ which were atributed to $MoO_3$.

EXAMPLE 3

Fe-Mo-DBH was made according to the chemical vapor deposition (CVD) procedure of Example 2, but using $MoCl_5$ for Mo deposition. It was analyzed and contained 1.5 wt % Fe and 5.2 wt % Mo (Mo/Fe=2.05). Catalyst, 1 mL (0.521 g) was loaded into a micro-quartz reactor equipped with an on-line GC, and calcined in the reactor at 675° C. for 16 hours. Calcined catalyst was tested in oxidation of a p-xylene stream (1 vol % $O_2$, 1 vol % $N_2$, 0.1 vol % p-xylene, and balance He) under the following conditions:

Temperature: 350° C.,
Flow rate: 400 sccm,
Contact time: 0.15 sec,
WHSV: 0.22 $hr^{-1}$,
Molar ratio of $O_2$/PX: 10/1.

Effluent gas was analyzed with the on-line GC, and the results were 67% p-xylene conversion, 9% COx ($CO_2$+CO)) selectivity, 28% TAL selectivity, 50% TPAL selectivity, 9% toluic acid selectivity, and 4% benzoic acid plus toluene selectivity.

EXAMPLE 4

The gas phase oxidation of Example 3 was repeated except the feed gas contained 4.0 vol % $O_2$, 4.0 vol % $N_2$, and 0.1 vol % p-xylene in He (molar ratio of O/PX=40). Results were 78% PX conversion, 20% COx selectivity, 17% TAL selectivity, 46% TPAA selectivity, 13% maleic anhydride selectivity, and 5% benzoic acid plus toluene selectivity. While obtaining PX conversion of 78% at an unusually high molar ratio of $O_2$/PX, this example demonstrated, advantageously, only moderate burning.

EXAMPLE 5

Another Fe-Mo-DBH was made according to the chemical vapor deposition (CVD) procedure of Example 2, but using $MoOCl_2$ for Mo deposition. It was analyzed and contained 2.55 wt % Fe, 14.5 wt % Mo, and 0.05 wt % B (Mo/Fe=3.3). Catalyst (2 g) was loaded into a micro-quartz reactor equipped with on-line GC, and treated with air at 400° C. for 1 hr. Treated catalyst was tested in oxidation of a p-xylene stream at 375° C. by pumping PX at a rate of 0.77 g/hr into a flowing gas mixture of 500 mL/min of 6 vol % $O_2$ in $N_2$, and 1000 mL/min pure N2. The effluent stream was analyzed by GC, and results were 20% PX conversion, 37% COx selectivity, 28% TAL selectivity and 39% TPAL selectivity.

After this run at 375° C. the Fe-Mo-DBH catalyst was calcined in the reactor at 680° C. for 1 day and another p-xylene oxidation was carried out under identical conditions. A remarkable improvement in catalyst performance was observed. Conversion of p-xylene was increased from 20% to 68% and selectivity to TPAL and TAL were also improved, respectively, from 39% to 47% and from 18% to 21%, while $CO_2$ selectivity decreased from 37% to 19%.

Subsequently, the Fe-Mo-DBH catalyst was further calcined in situ with air at 695° C. for a prolonged period (1 day and then an additional 4 days). During the calcining period, iron remained intact on the catalyst while excess $MoO_3$ was continually sublimed off to a final level of 7.0 wt % Mo. Thus the molar ratio Mo/Fe became 1.8 at the end of this calcination. Treated catalyst was tested in oxidation of a p-xylene stream at varying reaction temperatures. Following is a summary of results obtained.

TABLE 1

PX Oxidation Over a Fe—Mo—DBH

| Temp. °C. | PX conv. % | Selectivity, % | | | Yield, % | |
|---|---|---|---|---|---|---|
| | | TPAL | TAL | COx | TPPAL | TAL |
| 375 | 32 | 54 | 28 | 14 | 17 | 9 |
| (1 day calcination at 695° C.) | | | | | | |
| (After 4 more days calcination at 695° C.) | | | | | | |
| 375 | 17 | 58 | 27 | 13 | 9 | 5 |
| 425 | 43 | 60 | 18 | 18 | 26 | 8 |
| 500 | 74 | 64 | 9 | 21 | 47 | 7 |
| 564 | 83 | 60 | 6 | 28 | 50 | 7 |
| 510 | 79 | 67 | 9 | 19 | 53 | 7 |
| 500 | 74 | 64 | 9 | 21 | 47 | 7 |

Mole ratio $O_2$/PX was 40

EXAMPLE 6

A Fe-Mo-DBH catalyst treated as in the initial step of Example 5 with air at 400° C. for 1 hr (Mo/Fe=3.3), and then was calcined in the reactor at 675° C. for 16 hours. The Fe-Mo-DBH catalyst obtained had a molar ratio Mo/Fe of 1.8. Calcined catalyst was tested in oxidation of a p-xylene stream at the conditions used in Example 3. Results were 76% p-xylene conversion, and selectivities to TPAL, TAL and COx were, respectively, 54%, 26% and 17%.

EXAMPLE 7

Another Fe-Mo-DBH catalyst was made according to the chemical vapor deposition (CVD) procedure of Example 2, but using $MoOCl_4$ for Mo deposition. It was analyzed and contained 1.2 wt % Fe, 4.8 wt % Mo, and 272 ppm B (Mo/Fe=4.2). Raman spectrum of this catalyst show peaks for $Fe_2(MoO_4)_3$ and $MoO_3$ phases, but the $\alpha$-$Fe_2O_3$ phase, an active species for promoting burning, was absent. Catalyst (1 mL, 0.52 g) was tested in a micro-reactor for oxidation of p-xylene under identical conditions used in Example 3 at varying temperatures of reaction. Following is a summary of results obtained.

TABLE 2

PX Oxidation Over a Fe—Mo—DBH

| Temp °C. | PX % | Selectivity, % | | | | | | | Yield, % | |
|---|---|---|---|---|---|---|---|---|---|---|
| | | TPAL | TAL | BA | TOL | MA | CO | CO2 | TPAL | TAL |
| 250 | 6.6 | 20.4 | 45.4 | — | 9.6 | — | 16.3 | 7.5 | | |
| 300 | 15.5 | 38.0 | 44.7 | 1.3 | 1.6 | — | 6.1 | 8.4 | 5.9 | 6.9 |
| 325 | 23.8 | 47.3 | 33.3 | 1.5 | 1.3 | 2.2 | 4.2 | 9.1 | 9.8 | 7.9 |
| 350 | 42.8 | 48.6 | 29.2 | 1.9 | 1.4 | 4.0 | 4.3 | 10.6 | 20.8 | 12.5 |
| 375 | 69.2 | 42.2 | 25.2 | 2.2 | 1.7 | 6.8 | 5.8 | 16.1 | 29.2 | 17.4 |
| 400 | 89.1 | 35.7 | 19.3 | 2.1 | 1.7 | 9.2 | 8.2 | 23.3 | 31.8 | 17.2 |

TOL: toluene,
BA: benzaldehyde,
MA: maleic anhydride

EXAMPLE 8

A 350 g sample of HAMS-1B sieve containing about 1.8 wt % of boron was exchanged using an ammonium acetate solution (150 g of ammonium acetate in 3.5 L of water with stirring at ambient temperature for 30 min. The result was filtered and dried. Dried exchanged HAMS-1B sieve was calcined for 5 hr at 660° C. and when analyzed using the ICP technique contained 0.9 wt % boron.

Dried and exchanged sieve was again calcined at 400° C., loaded into a tube and dry nitrogen containing anhydrous $FeCl_3$ passed over the sieve at 460° C. The sieve was removed from the tube, cooled, heated at 90° C. in deionized water for 1.5 hr and then filtered and dried. This procedure was repeated twice more. The resulting product was 1.5 wt % iron and 0.134 wt % boron by ICP analysis.

Iron loaded sieve was treated, by a process similar to the iron loading procedure, with $MoO_2Cl_2$ yielding iron-molybdenum loaded sieve containing 1.5 wt % iron and 8.4 wt % molybdenum. The material was heated 650° C. for 8 hr in nitrogen and washed three times and when analyzed by ICP was 1.62 wt % iron and 3.05 wt % molybdenum.

Iron-molybdenum loaded sieve was treated, in a process similar to the molybdenum loading procedure, with $WOCl_4$ yielding an iron-tungsten material loaded sieve containing 1.2 wt % Fe, 10.2 wt % W and 0.11 wt % Mo. After tungsten deposition, the material was removed from the tube and calcined in air at 650° C. for 8 hr. Tungsten deposition was carried out at 290° C. instead of 220° C. This higher temperature allowed more molybdenum to vaporize from the sieve.

A 1 mL sample (0.52 g) was loaded into a micro reactor and fed a stream composed of 1 vol % $O_2$, 1 vol % $N_2$, 0.1 vol % PX in He at a WHSV of 0.114 $hr^{-1}$. The oxidation results obtained are shown below in Table 3.

TABLE 3

PX Oxidation Over a Fe—W—DBH

| | Temperature, °C. | | |
|---|---|---|---|
| | 350 | 375 | 400 |
| PX Conversion, % | 46 | 67 | 87 |
| $O_2$ Conversion, % | 18 | 31 | 58 |
| Selectivities[1] | | | |
| Benzene | 0.3 | 0.6 | 1.1 |
| toluene | 10.5 | 8.6 | 6.8 |
| Maleic Anhydride | 8.4 | 11.5 | 16.8 |
| Benzaldehyde | 1.2 | 1.8 | 2.3 |
| TAL | 12.7 | 9.7 | 5.9 |
| TPAA | 23.8 | 26.1 | 21.5 |
| CO | 2.0 | 3.6 | 6.4 |
| $CO_2$ | 11.2 | 18.2 | 29.7 |

[1] Mol % of the product based upon the total xylene convert

COMPARATIVE EXAMPLE 9

A mixed oxide of iron and molybdenum on silica was prepared using a co-formation technique by adding aqueous solutions of ammonium paramolybdate and Fe(III) nitrate to Nalco silica gel 1034A with vigorous agitation over a period of several hours. After standing, the gel was dried in a vacuum oven, calcined, and sieved to a 20/40 mesh particle size. The mixed oxide material was 2.58 wt % Mo and 0.93 wt % Fe by ICP analysis (Mo/Fe=1.6). Results using this mixed oxide material to catalyze oxidation of p-xylene are shown in Table 4 below.

TABLE 4

PX Oxidation Over Co-formed Fe and Mo on Silica[1,2]

| Temp. °C. | PX Conv. % | Selectivities, % | | |
|---|---|---|---|---|
| | | TPAA | TAL | $CO_2$ |
| 375 | 4.5 | 10 | 18 | 67 |

[1]$O_2$/PX of feed was 10 in $N_2$
[2]WHSV = 0.385 $hr^{-1}$ (2g catalyst)

EXAMPLE 10

Two Fe-Mo-DBH compositions were made starting with an ammonium acetate exchanged HAMS-1B sieve containing 0.87 wt B and 33.5 wt % Si. Results for p-xylene oxidation at 375° C. over the two materials is shown below in Table 5.

TABLE 5

Effect of Different Mo/Fe Ratios on the PX Oxidative Properties of Fe—Mo—DBH

| % B | % Mo | Mo/Fe Ratio | Total Metals g | PX Conv. % | Selectivities, % | | |
|---|---|---|---|---|---|---|---|
| | | | | | TPAA | TAL | $CO_x$ |
| 0.05 | 9.9 | 3.3 | 11.61 | 20.3 | 39 | 18 | 37 |
| * | 6.9 | 1.8 | 8.8 | 54 | 51 | 23 | 18 |

* not measured

EXAMPLE 11

Soxhlet extraction of HAMS-1B sieve with water for a period of two days obtained a DBH sieve having 121 ppm of boron. The deboronated sieve was treated in the vapor phase at about 450° C. with $FeCl_3$ yielding a solid which was washed and dried. A portion (4.7 g) of Fe-DBH was treated with $MoO_2Cl_2$ in the vapor phase at about 200° C. yielding a yellow-green solid which was calcined and washed with deionized water several times. Analysis by ICP was 7.5 wt % Mo and 2.37 wt % Fe (Mo/Fe=1.84). The product, Fe-Mo-DBH, had BET surface area of about 286 $m^2/g$. Table 6 below shows results of catalytic oxidation of p-xylene.

TABLE 6

Oxidation of PX Over Calcined and Uncalcined Pre-deboronated Fe—Mo—DBH[1,2,3]

| Temp. °C. | PX Conv. % | Selectivities, % | | | |
|---|---|---|---|---|---|
| | | TPAA | TAL | TOL | $CO_x$ |
| 275 | 6 | 12.7 | 48.4 | 17.5 | 7.5 |
| | (7) | (14.0) | (52.1) | (16.2) | (12.2) |
| 300 | 13 | 34 | 44.5 | 6.8 | 8.4 |
| | (13) | (20.3) | (52.0) | (9.9) | (13.6) |
| 325 | 24 | 28.7 | 48.4 | 6.1 | 11.5 |
| | (26) | (22.5) | (44.7) | (7.6) | (22.1) |
| 350 | 43 | 29.8 | 39.7 | 5.7 | 18.5 |
| | (49) | (20.6) | (32.9) | (6.7) | (34.3) |
| 375 | 68 | 24.3 | 29.0 | 5.1 | 33 |
| | (84) | (10.7) | (17.4) | (5.4) | (58.3) |

[1]Feed is 1.0% $O_2$, 1.0% $N_2$ and 1.0% PX in He.
[2]Calcination at 700° C. for 13 hr
[3]Values in parenthesis are for uncalcined Fe—Mo—DBH

EXAMPLE 12

A 420 g amount of HAMS-1B sieve was heated at reflux with 3.5 L of deionized water for about 3 hr, solids separated and dried at ambient temperature. This procedure was repeated. Resulting solids were calcined at temperatures up to a temperature of 550° C. A portion of calcined solid was treated with $BiCl_3$ at about 460° C. The $BiCl_3$ deposited solid was washed and dried. ICP analysis gave less than 0.01 wt % $Cl^-$, 5.1 wt % Bi and 0.45% B. After another calcination at 500° C. for 2 hr, the Bi-DBH was heated with $MoO_2Cl_2$ at about 200° C. Resulting catalyst was washed and dried. ICP analysis showed catalust contained 5.1 wt % Bi and 3.84 wt % Mo (Mo/Bi=2.0). The Bi-Mo-DBH was used to oxidize p-xylene with the results shown in Table 7 below.

TABLE 7

PX Oxidation Over a Bi—Mo—DBH

| Temp. °C. | PX Conv. % | Selectivities, % | | |
|---|---|---|---|---|
| | | TPAA | TAL | $CO_x$ |
| 375 | 10.8 | 32 | 44 | 22 |
| 425 | 29.0 | 27 | 67 | 23 |

EXAMPLE 13

A 420 g amount of HAMS-1B sieve was heated at reflux with 3.5 L of deionized water for about 3 hr and then solids were separated and dried at ambient temperature. The procedure was repeated. Resulting solids were calcined at temperatures up to a maximum temperature of 550° C. A portion, 62.6 g, of calcined solid was treated with $MoO_2Cl_2$ at about 200° C. and then steamed for 2 hr resulting in 69.9 g of yellow-green solid. ICP analysis gave less than 0.01 wt % $Cl^-$ and 4.09 wt % Mo. Antimony was put on 1 g of Mo-DBH by vapor deposition at 150°–250° C. using $SbCl_3$ and the resulting solid steamed. A 7.6 g amount of yellow-green solid was produced which was washed 3 times with deionized water and oven dried. Chloride content of the Sb-Mo-DBH was less than 0.1 wt %. The Sb and Mo contents were, respectively, 4.5 and 6.5 wt % (Mo/Sb=1.80). Catalytic results are shown below in Table 8.

TABLE 8

PX Oxidation over Sb—Mo—DHB[1]

| Temp. °C. | PX Conv. % | Selectivities, % | | | |
|---|---|---|---|---|---|
| | | TPAA | TAL | Toluene | $CO_x$ |
| 475 | 30 | 41.8 | 18.3 | 12.2 | 23.6 |
| 500 | 68 | 36.6 | 11.2 | 16.1 | 28.5 |

[1]Feed is 0.1 vol. % PX, 1.0 vol. % $O_2$, 1.0 vol. % $N_2$ in helium

EXAMPLE 14

A Zn-Mo-DBH catalyst which analyzed 9.5 wt % Mo and 2.4 wt Zn, was prepared according to the CVD procedure of Example 2 except that an aqueous solution of zinc nitrate was used to make an impregnated Zn-DBH (dried at 400° C.) prior to applying a CVD step with $MoO_2Cl_2$. After catalyst was loaded into a microreactor and calcined 16 hrs at 680° C., p-xylene was oxidized at 450° C. under identical conditions described in Example 3. Results were 59% PX conversion, 40% TPAL selectivity, 27% TAL selectivity, 31% COx selectivity, and 2% toluene selectivity

EXAMPLE 15

Fe-Mo-DBH was made according to the CVD procedure of Example 2, but using $MoCl_5$ for Mo deposition. It was analyzed and contained 2.15 wt % Fe, 5.8 wt % Mo, and 269 ppm B (Mo/Fe=1.57). Fe-Mo-DBH catalyst (0.335 g) was tested in oxidation of a mixed xylene feed (PX/MX/OX was 1/2/1) stream of 2 vol % $O_2$, 2 vol % $N_2$, and balance He. Results are shown in Table 9 below.

TABLE 9

Oxidation of a Mixed Xylene Stream Over Fe—Mo—DBH

| Temp. °C. | Xyl. Conv. % | PX Conv. % | Selectivities | | | | |
|---|---|---|---|---|---|---|---|
| | | | p-TAL % | m-/o-TAL % | TPAA % | $CO_x$ % | |
| 300 | 1 | 3 | 92 | * | * | 8 | |
| 325 | 2 | 7 | 52 | * | 47 | 1 | |
| 350 | 4 | 15 | 43 | * | 44 | 14 | |
| 375 | 8 | 29 | 39 | * | 46 | 15 | |
| 400 | 13 | 45 | 35 | * | 48 | 17 | |
| 425 | 21 | 64 | 28 | 4 | 48 | 18 | |
| 450 | 28 | 80 | 22 | 7 | 48 | 21 | |
| 475 | 35 | 92 | 18 | 14 | 41 | 25 | |

* negligible

EXAMPLE 16

The same catalyst composition used in Example 15 was used in this Example to oxidize a stream containing 0.14 vol % of o-xylene, 6 vol % $O_2$, and 6 vol % $N_2$ in helium. The $O_2$ to o-xylene ratio was 43. Results are shown in Table 10 below.

TABLE 10

Oxidation of o-Xylene Over Fe—Mo—DBH

| | Temp., °C. | | | |
|---|---|---|---|---|
| | 350 | 400 | 450 | 500 |
| o-Xyl Conv., % | 6 | 14 | 23 | 53 |
| Selectivities, % | | | | |
| TEBPM[1] | * | 21 | 14 | 12 |
| PLCA[4] | 17.9 | 7.6 | 1.6 | 0.2 |
| o-TAL[2] | 33 | 14 | 24 | 27 |
| THAL[3] | Trace | Trace | Trace | Trace |
| THAN[4] | | 29 | 21 | 20 |
| $CO_x$ | 66 | 36 | 41 | 41 |

[1] TEBPM is trimethylbiphenyl-methane
[2] o-TAL is o-tolualdehyde
[3] THAL is phtalaldehyde
[4] THAN is phthalic anhydride
* negligible

EXAMPLE 17

Fe-Mo-DBH was made according to the CVD procedure of Example 2. It was analyzed and contained 1.77 wt % Fe and 6.9 wt % Mo (Mo/Fe=2.3). Fe-Mo-DBH catalyst (0.511 g) was tested in oxidation of o-xylene in a stream of 2 vol % $O_2$, 2 vol % $N_2$, and balance He under the following conditions at varying temperatures.

| WHSV: | 0.28 hr$^{-1}$, |
|---|---|
| Contact time: | 0.105–0.21 sec. |

Results are shown in Table 11 below.

TABLE 11

Oxidation of o-Xylene Over Fe—Mo—DBH

| | Temp., °C. | | | |
|---|---|---|---|---|
| | 250 | 400 | 500 | 550 |
| o-Xyl Conv., % | 0 | 8.6 | 77.1 | 97.0 |
| Selectivities, % | | | | |
| TEBPM[1] | * | 7.6 | 13.9 | 18.6 |
| Benzaldehyde | * | 0.9 | 0.6 | 0.7 |
| o-TAL[2] | * | 47.8 | 58.5 | 41.5 |
| THAL[3] | * | 0.8 | 2.1 | 2.1 |
| THAN[4] | * | 7.8 | 8.1 | 18.3 |
| MAN[5] | * | 8.9 | 7.4 | 8.3 |
| CO | 0 | 6.6 | 3.7 | 5.9 |

TABLE 11-continued

Oxidation of o-Xylene Over Fe—Mo—DBH

| | Temp., °C. | | | |
|---|---|---|---|---|
| | 250 | 400 | 500 | 550 |
| $CO_2$ | 0 | 19.0 | 5.9 | 5.7 |

[1] TEBPM is trimethylbiphenyl-methane
[2] o-TAL is o-tolualdehyde
[3] THAL is phtalaldehyde
[4] THAN is phthalic anhydride
[5] MAN is maleic anhydride
* negligible

EXAMPLE 18

Fe-Mo-DBH was made according to the CVD procedure of Example 2. Fe-Mo-DBH catalyst was analyzed and contained 1.61 wt % Fe and 7.2 wt % Mo (Mo/Fe=2.6). This catalyst (10 g) was impregnated with an aqueous $AgNO_3$ solution (0.133 g $AgNO_3$ was dissolved in 15 mL deionized water) by the incipient wetness method. Silver impregnated catalyst, Ag/Fe-Mo-DBH, was analyzed and contained 6.2 wt % Mo, 1.85 wt % Fe, and 760 ppm Ag. It was pressed and sieved to 20/40 mesh size. Ag/Fe-Mo-DBH catalyst (1.4 mL, (0.51 g) was loaded into a micro-reactor, and oxidation of o-xylene was carried out in a gas stream comprised of 2 vol % $O_2$ and 2 vol % $N_2$ in He. Results summarized in Table 12, demonstrated that side reactions occurring in the oxidation with Fe-Mo-DBH, such as disproportionation of o-xylene to toluene and pseudocumene, and dehydrocoupling of o-xylene to trimethylbiphenylmethane, can be suppressed by incorporating Ag into Fe-Mo-DBH catalyst.

Oxidation of o-xylene was at at varying temperatures under the following conditions.

| WHSV: | 0.28 hr$^{-1}$, |
|---|---|
| Contact time: | 0.09 sec, |
| Temperature: | 400–550° C. |

Results are shown in Table 12 below.

TABLE 12

Oxidation of o-Xylene Over Ag/Fe—Mo—DBH

| | Temp., °C. | | | |
|---|---|---|---|---|
| | 400 | 450 | 500 | 550 |
| o-Xyl Conv., % | 8.1 | 22.8 | 53.0 | 71.3 |
| Selectivities, % | | | | |
| TEBPM[1] | 3.2 | 4.6 | 8.3 | 8.8 |
| Benzaldehyde | * | 0.3 | 0.4 | 0.9 |
| o-TAL[2] | 78.6 | 83.5 | 75.7 | 64.2 |
| THAL[3] | 0.3 | 0.6 | 0.9 | 0.9 |
| THAN[4] | 2.8 | 3.0 | 5.6 | 9.1 |
| MAN[5] | * | * | 1.6 | 2.6 |
| CO | 0 | 0 | 1.8 | 3.5 |
| $CO_2$ | 15 | 7.9 | 5.2 | 9.5 |

[1] TEBPM is trimethylbiphenyl-methane
[2] o-TAL is o-tolualdehyde
[3] THAL is phtalaldehyde
[4] THAN is phthalic anhydride
[5] MAN is maleic anhydride
* negligible

COMPARATIVE EXAMPLE 19

A 1.4 g (0.8 mL) sample of ferric molybdate, $Fe_2(MoO_4)_3$, 20–40 mesh size, was loaded into a micro-reactor, and o-xylene oxidized in a gas stream comprised of 2 vol % $O_2$ and 2 vol % $N_2$ in He. In a typical run at 400° C., only 0.4 vol % of o-xylene was converted to give o-tolualdehyde (83% selectivity), phthalaldehyde(8.8% selectivity), and phthalic anhydride(8.0% selectivity) without burning. Oxidation of o-xylene was carried out at varying temperatures under the following conditions.

| WHSV: | 0.10 hr$^{-1}$, |
|---|---|
| Contact time: | 0.07 sec, |
| Temperature: | 400–600° C. |

Results are shown in Table 13 below.

TABLE 13

Oxidation of o-Xylene Over Fe$_2$(MoO$_4$)$_3$

| | | Selectivities, % | |
|---|---|---|---|
| Temp., °C. | o-Xyl Conv. | o-TAL[2] | THAL[3] | THAN[4] |
| 400 | 0.4 | 83.2 | 8.8 | 8.0 |
| 500 | 1.0 | 88.7 | 4.6 | 3.6 |
| 600 | 13.8 | 87.9 | 5.7 | 4.0 |

[2]o-TAL is o-tolualdehyde
[3]THAL is phtaladehyde
[4]THAN is phthalic anhydride

EXAMPLE 20

The same catalyst composition used in Example 15 was used in this Example to oxidize a stream containing 0.14 vol % of m-xylene, 6 vol % O$_2$, and 6 vol % N$_2$ in helium. The O$_2$ to m-xylene ratio was 43. Results are shown in Table 14 below.

TABLE 14

Oxidation of m-Xylene Over Fe—Mo—DBH

| Temp. °C. | m-Xyl Conv. % | Selectivities % | |
|---|---|---|---|
| | | m-TAL | CO$_x$ |
| 350 | 3 | 67 | 33 |
| 400 | 9 | 33 | 67 |
| 450 | 20 | 65 | 34 |
| 500 | 44 | 58 | 39 |

EXAMPLE 21

In this example separation of p-xylene from its isomer mixture was obtained by preferential oxidation of p-xylene over Fe-Mcatalyscatalyst. Fe-Mo-DBH catalyst having an pre-oxidation analysis by ICP of 2.15 wt % Fe, 5.8 wt % Mo, and 269 ppm B (Mo/Fe=1.57), was intermittently used in gas phase oxidation screening reactions with xylene isomers for about six months. Used catalyst was removed from the reactor and analyzed by ICP to contain 2.15 wt % Fe, 5.80 wt % Mo, 269 ppm B, and Mo/Fe=1.57. This aged catalyst was used to oxidize the thermodynamic distribution of xylene isomer mixture, p-xylene, m-xylene, and o-xylene.

Aged catalyst, 0.335 g (1.0 mL), was loaded into a micro-reactor equipped with an on-line GC. Catalyst was pre-calcined in situ at 700° C. for 2 hours. A 10 mL syringe was filled with the xylene isomer mixture and was calibrated on the syringe pump at 0.1286 g/hr. WHSV for mixed xylene and p-xylene alone were, respectively, 0.38 L/hr and 0.09 L/hr. By means of a Brook mass flow controller 400 sccm of gas (2 vol % O$_2$, 2 vol % N$_2$, and balance He) was passed over the catalyst to give a contact time of 0.14 sec. Molar ratio of O$_2$/xylenes was 18 and of O$_2$/p-xylene was 71. A Supelco Wax capillary column was used to analyze the xylene isomers. Conversion and selectivity were based on the detected products. Reaction conditions were as follows.

PX:MX:OX=1:2:1,
Catalyst loading: 0.335 g (1.0 mL),
O$_2$/xylene=18/1,
Flow rate: 400 sccm/min,
Contact time: 0.14 sec,
Total xylene pump rate (WHSV): 0.38 g/hr,
p-xylene pump rate (WHSV): 0.09 g/hr.

Results showed that p-xylene was preferentially oxidized at 400° C. in a mixed xylene stream at p-xylene conversion of 45%, while leaving other isomer intact. Selectivity of COx was 17% (based on p-xylene mol %), 35 mol % TAL selectivity, and 48 mol % TPAL selectivity. Results are shown in Table 15 below.

TABLE 15

Oxidation of a Mixed Xylene Feed Over Fe—Mo—DBH

| | Temperature, °C. | | | | | | |
|---|---|---|---|---|---|---|---|
| | 325 | 350 | 375 | 400 | 425 | 450 | 475 |
| Total xylene cov., mol % | 2 | 4 | 8 | 13 | 21 | 28 | 35 |
| p-Xylene conv., mol % | 7 | 15 | 29 | 46 | 64 | 80 | 92 |
| | selectivity based on C$_8$ mol % | | | | | | |
| Carbon oxides | 1 | 14 | 15 | 17 | 18 | 21 | 25 |
| Benzaldehyde | 0 | 0 | 0 | 0 | 2 | 2 | 2 |
| m,o-Tolualdehyde | 0 | 0 | 0 | 4 | 7 | 14 |
| TAL | 52 | 43 | 39 | 35 | 28 | 22 | 18 |
| TPAL | 47 | 44 | 46 | 48 | 48 | 48 | 41 |

EXAMPLE 22

The Fe-Mo-DBH catalyst used in Example 21 was again used in oxidation of a mixed xylene feed under the identical conditions employed in Run 6 except the feed also contained ethylbenzene in molar ratio of ethylbenzene:p-xylene:m-xylene:o-xylene=2:5:10:5, which is a composition typical of commercially available streams. Results shown in the following table demonstrate that a substantial portion of the ethylbenzene was converted along with p-xylene at reaction temperatures above 400° C. Styrene which was expected to be form by oxidation of ethylbenzene via dehydrogenation under these conditions, was, however, not detected. Results are shown in Table 16 below.

TABLE 16

Oxidation of a Mixed Xylene Feed Containing Ethylbenxend Over Fe—Mo—DBH

| | Temperature, °C. | | | | |
|---|---|---|---|---|---|
| | 350 | 375 | 400 | 425 | 450 |
| p-Xylene conv., mol % | 11 | 26 | 51 | 80 | 95 |
| Ethylbenzene conv., mol % | 0 | 4 | 12 | 25 | 42 |
| m-Xylene conv., mol % | 0 | 1 | 2 | 5 | 10 |
| o-Xylene conv., mol % | 0 | 0 | 2 | 7 | 12 |
| | selectivity based on C$_8$ mol % | | | | |
| Carbon oxides | 25 | 31 | 31 | 28 | 31 |
| Benzaldehyde | 0 | 0 | 4 | 4 | 5 |
| m, o-Tolualdehyde | 0 | 0 | 0 | 4 | 8 |
| TAL | 37 | 32 | 28 | 22 | 16 |
| TPAL | 39 | 37 | 39 | 41 | 41 |

EXAMPLE 23

For this Example Fe-Mo-DBH catalyst used in Example 22 was coated with tetramethylorthosilicate in the reactor. Fe-Mo-DBH catalyst was calcined at 500° C. for 2 hours and allowed to cool to 175° C. Tetramethylorthosilicate vapor was carried by nitrogen into the reactor at ambient temperature for 45 min. Then the reactor was heated under nitrogen to 360° C., nitrogen replaced with 160 sccm of air, and kept at 450° C. overnight. This procedure was repeated. Total amount of tetramethylorthosilicate passed through the reactor was estimated to be in a large excess over the saturation point for the exterior sites of the catalyst.

Oxidation of a mixed xylene feed containing ethylbenzene as employed in Example 22 was carried out under reaction conditions used in Example 22. Results, which are summarized in Table 17 below, demonstrate that silica coated Fe-Mo-DBH catalyst was more effective in selective oxidation of p-xylene from the xylene isomer mixture containing ethylbenzene.

TABLE 17

Oxidation of a Mixed Xylene Feed Containing Ethylbenxend Over Si/Fe—Mo—DBH

| | Temperature, °C. | | | | |
|---|---|---|---|---|---|
| | 350 | 375 | 400 | 425 | 450 |
| p-Xylene conv., mol % | 12 | 23 | 44 | 72 | 88 |
| Ethylbenzene conv., mol % | 2 | 3 | 4 | 14 | 31 |
| m-Xylene conv., mol % | <1 | <1 | <1 | <1 | <1 |
| o-Xylene conv., mol % | <1 | <1 | <1 | <1 | <1 |
| | selectivity based on $C_8$ mol % | | | | |
| Carbon oxides | 30 | 29 | 32 | 32 | 39 |
| Benzaldehyde | 2 | 3 | 4 | 14 | 31 |
| m, o-Tolualdehyde | 0 | 0 | 0 | 5 | 9 |
| TAL | 36 | 36 | 31 | 24 | 20 |
| TPAL | 34 | 36 | 33 | 34 | 26 |

EXAMPLE 24

Fe-Mo-DBH catalyst was made according to the procedure set out in Example 8 and when analyzed contained 9.1 wt % Mo and 2.37 wt % Fe (Mo/Fe=2.2). Fe-Mo-DBH catalyst (1.4 mL, 0.5 g) was loaded into a quartz microreactor and tested in p-xylene conversion for TPAA and TAL yield with a feed admixed with He and $CO_2$. Results at 325° C. showed that in He p-xylene conversion was 37.7% with 47.5 mol % TAL selectivity, 42.0 mol % TPAA selectivity, and selectivity to benzaldehyde of 3.4 mol %, but in $CO_2$, conversion of p-xylene was 61.6% with 41.8 mol % TAL selectivity, 40.0 mol % TPAA selectivity, and selectivity to benzaldehyde was 3.0mol %. Results are shown in Table 18 below.

TABLE 18

PX Oxidation With He or $CO_2$ Over Fe—Mo—DBH

| Temp. (°C.) | PX Conv.[1] (%) | PX Conv.[2] (%) |
|---|---|---|
| 250 | 6.9 | 18.2 |
| 275 | 12.5 | 25.6 |
| 300 | 22.1 | 40.2 |
| 325 | 37.7 | 61.6 |
| 350 | 57.0 | 82.5 |
| 375 | 77.3 | 95.6 |
| 400 | 93.3 | 99.0 |

[1]0.1 vol % PX, 1.0 vol % $O_2$, 1.0 vol % $N_2$ in He
[2]0.1 vol % PX, 1.0 vol % $O_2$, 1.0 vol % $N_2$ in $CO_2$

EXAMPLE 25

Fe-Mo-DBH catalyst was made according to the procedure set out in Example 8 and contained 6.8 wt % Mo, 1.88 wt % Fe, and 0.05 wt % B (Mo/Fe=2.2). About 1.4 mL (0.5 g) of Fe-Mo-DBH catalyst was loaded into a quartz microreactor and tested in p-xylene conversion for TPAA and TAL yield with a feed admixed with He and $CO_2$. Results at 350° C. showed that in He p-xylene conversion was 41.2% with 50.2 mol % TAL selectivity, 23.5 mol % TPAA selectivity, selectivity to benzaldehyde of 2.4 mol %, and selectivity to maleic anhydride of 2.4 mol %, but in $CO_2$ conversion of p-xylene was 65.5% with 9.1 mol % TAL selectivity, 11.1 mol % TPAA selectivity, selectivity to benzaldehyde of 2.7 mol %, and selectivity to maleic anhydride was increased to 6.0 mol %. Results are shown in Table 19 below.

TABLE 19

PX Oxidation With He or $CO_2$ Over Fe—Mo—DBH

| Temp. (°C.) | PX Conv.[1] (%) | PX Conv.[2] (%) |
|---|---|---|
| 250 | 8.6 | 23.4 |
| 275 | 11.1 | |
| 300 | 17.6 | 33.3 |
| 325 | 28.3 | |
| 350 | 41.2 | 65.5 |
| 375 | 60.7 | 84.1 |
| 400 | 81.5 | 96.3 |
| 425 | 96.3 | |

[1]0.1 vol % PX, 1.0 vol % $O_2$, 1.0 vol % $N_2$ in He
[2]0.1 vol % PX, 1.0 vol % $O_2$, 1.0 vol % $N_2$ in $CO_2$

EXAMPLE 26

Example 25 was repeated with a Fe-Mo-DBH composition made according to the procedure of Example 8 containing 6.8% wt % Mo and 1.85 wt % Fe (Mo/Fe=2.15). Results are shown in Table 20 below.

TABLE 20

PX Conversions and Aldehyde Yield Ratios For Different $CO_2$ Levels[1]

| Temp. °C. | Conv. Ratio $CO_2$/He | $MA^2$ Yield Ratio $CO_2$/He | PTAA + TAA Yield Ratio $CO_2$/He |
|---|---|---|---|
| 300 | 33/13 | 0/0 | 28/12 |
| 350 | 66/40 | 6/2 | 55/37 |
| 375 | 84/59 | 15/6 | 64/53 |
| 400 | 96/82 | 28/11 | 60/68 |

[1]0.1 vol % PX, 1.0 vol % $O_2$, 1.0 vol % $N_2$ in He or $CO_2$
[2]MA is maleic anhydride

COMPARATIVE EXAMPLE 27

An aluminosilicate with the MFI structure having a Si/Al ratio of 30/1 was made using 6. Kg $H_2O$, 570 g NaOH, 320 g $NaAlO_2 \cdot 3H_2O \cdot 0.11NaOH$, 8.955 Kg of 35% tetrapropylammonium bromide, and 14.548 g of Ludox AS-40 (40% silica). Reactants were placed in a 10 gal autoclave and heated at 152° C. for 120 hr. The aluminosilicate was ammonium exchanged with $NH_4NO_3$ solution filtered, dried at 120° C. overnight, and calcined at 538° C. for 3 hr. The product contained 1.13% Al. The sieve was treated first with $FeCl_3$ at about 415° C., washed and dried, and the result treated with $MoO_2Cl_2$ at about 300° C. It was again washed and dried to give a product containing about 2.21 wt % Fe and 5.3 wt % Mo (Mo/Fe=1.4). Results over this Fe/Mo Aluminosilicate to catalyze the oxidation of PX are shown below in Table 21. The catlyst was then treated with additional $MoO_2Cl_2$ and $MoO_3$ to increase the atomic ratio to a level of Mo/Fe=2.0, and testes again for oxidation of PX under the same conditions of reaction. Results were essentially identical to those shown below in Table 21.

TABLE 21

PX Oxidation Over Fe/Mo Aluminosilicate (ZSM-5 Type) Catalyst

| Temp. °C. | PX Conv. % | Selectivities[3], % | | | |
|---|---|---|---|---|---|
| | | Tol[1] | PSC[2] | p-TAL[4] | $CO_x$ |
| 250 | 18 | 74 | 23.8 | * | 3.7 |
| 300 | 25 | 60 | 17 | * | 22.2 |
| 350 | 56 | 66 | 3.8 | * | 21.0 |
| 400 | 95 | 36 | 0.3 | * | 42.6 |

[1]Tol is toluene
[2]PSC is pseudocumene
[3]No TPAA was found
[4]Less than 1%

COMPARATIVE EXAMPLE 28

A portion (100 g) of Silicalite S-115 (Union Carbide) was steamed and heated at a rate of 5° C. per rain to 650° C. and then held at 650° C. for 1 day. The temperature was then raised while steaming at 5° C. to 800° C. and held there for 6.9 days. After calcining 97.2 g were recovered. The sample was then heated with $SOCl_2$ vapor to remove aluminum. The resulting solid was first treated with $FeCl_3$ vapor and then $MoCl_5$ vapor. ICP analysis give 5.8 wt % Mo and 1.3 wt % Fe (Mo/Fe=2.6). A feed of 0.1 vol. % p-xylene, 1.0 vol % $O_2$, 2.0 vol. % $N_2$ in He was oxidized over the Fe/Mo Silicalite with the results shown below in Table 22.

TABLE 22

Fe/Mo/Silicalite Oxidation of PX

| Temp., °C. | PX Conv., % | Selectivities, % | | |
|---|---|---|---|---|
| | | PTAA | TAL | $CO_x$ |
| 300 | <1 | 0 | 24.8 | 68.4 |
| 350 | 1.6 | 6.6 | 27.0 | 61.5 |
| 400 | 5.7 | 8.4 | 21.1 | 72.8 |
| 450 | 17.5 | 14.1 | 20.4 | 61.5 |
| 500 | 40.5 | 27.2 | 21.6 | 45.4 |
| 550 | 65.5 | 33.4 | 18.5 | 39.8 |

EXAMPLE 29

Fe-Mo-DBH catalyst employed in Example 10 (Mo/Fe=1.8) was tested in a gas phase $O_2$-oxidation of pseudocumene. Catalyst (0.504 g, 1.4 mL), was loaded into a quartz reactor equipped with an on-line GC, and the oxidation of pseudocumene was carried with a premixed gas containing 4.0 vol % $O_2$, and 4.0 vol % $N_2$ in He. The effluent product stream was analyzed by GC. In a typical run at 450° C., pseudocumene was converted to methylterephthaldehyde (47.9 mol % selectivity), 3,4-dimethylbenzaldehyde (11.7 mol % selectivity), 2,5-dimethylbenzaldehyde (9.7 mol % selectivity), 2,4-dimethylbenzaldehyde (8.2 mol % selectivity) and COx (19.5 mol % selectivity) at 27.5 mol % conversion of pseudocumene.

EXAMPALE 30

The Sb-Mo-DBH catalyst used in Example 13 was also used for a gas phase $O_2$-oxidation of pseudocumene. Catalyst (0.499 g, 1.4 mL), was loaded into a quartz reactor, and the oxidation of pseudocumene was carried out by feeding a premixed gas containing 4.0 vol % $O_2$ and 4.0 vol % $N_2$ in He at 550° C. The effluent product stream was analyzed by GC giving selectivities to methylterephthaldehyde, 3,4-dimethylbenzaldehyde, 2,4-dimethylbenzaldehyde, 2,5-dimethylbenzaldehyde and COx of, respectively, 37.1 mol %, 17.0 mol %, 12.6 mol % 15.1 mol %, and 18.2 mol %, at a pseudocumene conversion of 14.1 mol %

EXAMPLE 31

Durene was dissolved in benzene to give a molar ratio of benzene/durene of 2.2. The solution was pumped into the micro-reactor and loaded with 0.50 g of the same Fe-Mo-DBH catalyst used in Example 29 and oxidized in a flow of premixed gas consisting of 6 vol % $O_2$ and 6 vol % $N_2$ in He at two different temperatures, 425° C. and 450° C. Product effluent was analyzed by GC, and each product identified with GC/MS. Results are summarized in Table 23 below

TABLE 23

Oxidation of Durene Over Fe—Mo—DBH Catalyst

| Temp. °C. | A[1] | B[2] | C[3] | D[4] | E[5] |
|---|---|---|---|---|---|
| 425 | 6.3 | 1.1 | 1.4 | 3.1 | 2.6 |
| 450 | 35.6 | 6.7 | 7.4 | 8.2 | 8.1 |

[1]2,5-dimethylterephthaldehyde
[2]2,3-dimethylphthalic anhydride
[3]2,3-dimethylphthaldehyde
[4]2,4,5-trimethylbenzaldehyde
[5]Maleic anhydride

EXAMPLE 32

A amount of 2,6-dimethylnaphthalene was dissolved in benzene to give a solution containing a molar ratio of benzene to 2,6-dimethylnaphthalene of seven. This solution was pumped into the micro-reactor loaded with 0.52 g of the Fe-Mo-DBH catalyst employed in Example 31 and oxidized in a stream of 6 vol % $O_2$ and 6 vol % $N_2$ in He at 400° C. Reactor effluent, excluding $CO_2$, was analyzed by GC and GC-MS which identified as the sole organic product 2-methyl-6-formylnaphthalene, a monoaldehyde product. The amount of monoaldehyde product was 14 area % in 86 area % of 2,6-dimethylnaphthalene using a FID on the GC.

EXAMPLE 33

The Fe-Mo-DBH catalyst used in Example 318 was employed for oxidation of 4,4'-dimethyldiphenyl. 4,4'-dimethyldiphenyl was dissolved in benzene to give a molar ratio of benzene to substrate equal to 16. The resulting solution was pumped into the micro-reactor and the substrate was oxidized in a flow of 6 vol % $O_2$ and 6 vol % $N_2$ in He at 350° C. Analysis of the product effluent by GC and GC/MS showed that it consisted of 20 area % of 4-methyl-4'-formyldiphenyl, a monoaldehyde product, and 80 area % of starting material using a FID on the GC. Carbon dioxide was not determined.

COMPARATIVE EXAMPLE 34

A physical mixture was prepared using 0.5 g of $Fe_2(MoO_4)_3$ and 5.0 g of HAMS-1B sieve (1.09 wt % B) and 0.5 g of the mixture loaded in a micro-reactor. A $O_2$/PX mixture (10/1) was fed to reactor with results as shown in Table 24 below.

TABLE 24

PX Oxidation Over a Physical Mixture of $Fe_2(MoO_4)_3$ and HAMS-1B Sieve

| | Temp., °C. | | | | |
|---|---|---|---|---|---|
| | 300 | 350 | 400 | 450 | 500 |
| PX Conv., % | 0 | 2.6 | 8.2 | 22.4 | 46.6 |
| Selectivities, % | | | | | |
| Toluene | | 60.2 | 51.9 | 39.1 | 30.6 |
| Benzaldehyde | 0 | 3.2 | 4.4 | 6.7 |
| Pseudocumene | | 5.3 | 2.2 | 0.7 | 0.4 |

TABLE 24-continued

PX Oxidation Over a Physical Mixture of Fe$_2$(MoO$_4$)$_3$ and HAMS-1B Sieve

| | Temp., °C. | | | |
|---|---|---|---|---|
| | 300 | 350 | 400 | 450 | 500 |
| Trimethylbi-phenylmethane | | 17.9 | 7.6 | 1.6 | 0.2 |
| TAL | | 23.5 | 23 | 18.1 | 12.1 |
| TPAA | | 0 | 2.2 | 3.0 | 4.0 |
| CO | | 0 | 16.4 | 20.1 | 21.1 |
| CO$_2$ | | 0 | 0 | 10.6 | 20.7 |

COMPARATIVE EXAMPLE 35

A sample of Fe$_2$(MoO$_4$)$_3$ containing 10 wt % MoO$_3$, was used to oxidize a 10/1 mixture of O$_2$/PX under the conditions of Example 10. No conversion was found at temperatures below about 400° C. At 450° C. a p-xylene conversion of 9% was obtained with selectivities to TPAA, TAL and CO$_2$ of, respectively, 24%, 59%, and 18%.

EXAMPLE 36

Fe-Mo-DBH catalyst was made by the method of Example 2 and this catalyst contained 6.2 wt % Mo, 1.86 wt % Fe, and 0.109 wt % B. (Mo/Fe=1.94). A 10 g sample of this Fe-Mo-DBH catalyst was used for PX oxidation intermittently for 50 hr in a study of process conditions. PX oxidation was then continued using 2 g PX/hr, 2 L/min of air, 4 L/min of nitrogen with a WHSV of 0.20 hr$^{-1}$, contact time 0.28 sec, and 350° C. temperature. Results are shown in Table 25 below. Analysis of the catalyst after 200 hr use give 6.3 wt % Mo and 1.79 wt % Fe (Mo/Fe=2.05).

TABLE 25

PX Oxidation Catalyst Lifetime Study of Fe—Mo—BDH

| | Hours[1] | | | | | | |
|---|---|---|---|---|---|---|---|
| | 1 | 10 | 25 | 50 | 76 | 86 | 99 |
| PX Conv., % | 36.8 | 37.3 | 38.5 | 36.4 | 32.1 | 33.2 | 31.4 |
| MA | 6.1 | 6.9 | 6.4 | 5.7 | 5.9 | 6.2 | 5.7 |
| TAL | 31.7 | 37.2 | 37.9 | 38.7 | 39.3 | 38.4 | 40.4 |
| TPAA | 39.8 | 28.8 | 28.2 | 25.9 | 25.5 | 26.2 | 24.3 |
| TA[2] | 4.4 | 4.7 | 5.1 | 5.3 | 5.3 | 5.8 | 5.3 |
| CO$_x$ | 14.6 | 19.3 | 19.5 | 21.9 | 21.2 | 20.7 | 21.5 |

[1]Time on stream plus 50 hr
[2]p-toluic acid

EXAMPLE 37

Fe-Mo-DBH catalyst was prepared by the method of Example 2 and when analyzed contained 4.6 wt % Mo and 1.41 wt % Fe (Mo/Fe=1.92). A mixture of benzene and N$_2$ was passed over the sample in a reactor at temperatures of 350° C. to 410° C. and the oxidation products analyzed. At 350° C. the product effluent contained 92 wt % benzene and 8 wt % phenol. At 410° C. the content was 83 wt % benzene and 16 wt % phenol.

EXAMPLE 38

The Fe-Mo-DBH catalyst composition used in Example 29 was used to oxidatively dehydrogenate ethylbenzene, p-diethylbenzene and t-butylethylbenzene. Results are shown in Table 26.

TABLE 26

Oxidative Dehydrogenation of Alkylbenzenes Over Fe—Mo—DBH

| Compound | Temp. °C. | Conv. % | Selectivities, % | | | |
|---|---|---|---|---|---|---|
| | | | p-DVB[4] | VEB[5] | TPAA | |
| p-DEEB[1] | 325 | 75 | | 90 | | |
| | | | Benzald | MA | Styrene | COx |
| EB[2] | 325 | 5.2 | 37.9 | 0 | 25.3 | 36.8 |
| | 350 | 10.3 | 33.6 | 21 | 14.2 | 31.1 |
| | | | TBS[6] | Cracked Pdts. | | |
| TBEB[3] | 400 | 4.7 | 60 | 4 | | |
| | 450 | 11.8 | 60 | 3 | | |
| | 500 | 13.0 | 68 | 7 | | |

[1]p-diethylethylbenzene
[2]ethylbenzene
[3]t-butylethylbenzene
[4]p-divinylbenzene
[5]vinylethylbenzene
[6]t-butylstyrene

EXAMPLE 39

A co-formed Mo/Fe/SiO$_2$ catalyst was prepared by adding two aqueous solutions, ammoniumparamolybdate and ferric nitrate, simultaneously to Nalco silica gel 1034A under vigorous agitation at ambient temperature over a period of 3 hr. This mixture was allowed to react under agitation at 800° C. for another a few hours Resulting gel was kept at ambient temperature overnight. Water was removed from the gel by a rotary evaporator, dried in a vacuum oven, sieved to 20–40 mesh size, and calcined at 600° C. for 5 hrs. Calcined catalyst (12–16 g), 20–40 mesh size, was loaded into a quartz reactor. Feeds consisting of an aqueous solution of nitric acid (30%) and benzene were separately pumped. Nitrogen gas flow was regulated with a micrometering valve and measured by a gas bubble meter. Reactor effluent was cooled in a water condenser and then collected, typically, in a series of traps chilled with water/ice and dry ice/acetone. Nitrogen dioxide, a decomposition product of nitric acid, was purged by a carrier gas, nitrogen. Testing conditions, described below, were closely followed throughout this work.

Catalyst loading: 15–20 mL (12–16 g)
LVHSV of benzene: 0.1 hr$^{-1}$
Molar ratio of nitric acid/benzene: 2:1
Flow of nitrogen: 20–50 mL/min Reactants and products were identified and quantified by GC analysis on Shimadzu GC-9A fitted with a "Fused Silica" capillary column, 50 meter 007 FFAP, 0.25 mm I.D., 0.25 mm film thickness, Quadrex Corporation. Products were identified by GC and GC/MS spectroscopy. Typical results in a series of continuous run were listed in Table 26 below. The catalyst was still active even after a prolonged continuous run, longer than two months.

TABLE 26

One-step Hydroxylation of Benzene to Phenol
Gas Phase Nitric Acid Oxidation

| Run no. | 1 | 2 | 3 |
|---|---|---|---|
| Temperature, °C. | 370 | 450 | 475 |
| Reaction Product Distribution wt % | | | |
| Benzene | 43.88 | 56.89 | 59.30 |
| Nitrobenzene | 56.12 | 0.00 | 0.00 |
| Phenol | 0.00 | 41.00 | 38.89 |
| Unidentified | 0.00 | 2.11 | 1.81 |
| Recovery* | 72 | 67–75 | 76 |

*Theoretical recovery is 77–82% depending on the conversion level

EXAMPLE 40

In this Example a Fe-Mo-DBH catalyst was used for conversion of butane. Fe-Mo-DBH catalyst containing 8.70 wt % Mo and 1.08 wt % Fe was prepared from $FeCl_3$ and $MoO_2Cl_2$ according to the CVD technique and calcined at 650° C. for 8 hrs. Calcined catalyst contained 7.0 wt % Mo and 1.15 wt % Fe (Mo/Fe=3.5). Calcined catalyst (10 g, 28 mL), was loaded into a quartz reactor equipped with an on-line GC, and the oxidation of n-butane was carried out with air. Feed gas composition was 0.5 vol % n-butane in air (4.5 sccm n-butane and 792 sccm air). Conditions, described below, were closely followed throughout this work.

$O_2$/n-butane: 48
Flow rate: 795.0 sccm
WHSV: 0.103 $hr^{-1}$
Contact time: 2.113 sec.

TABLE 27

Conversion of Butant over Fe—Mo—DBH

| | Temperature, °C. | | | |
|---|---|---|---|---|
| | 350 | 375 | 400 | 425 |
| n-butane conv., % | 3.4 | 4.8 | 7.1 | 11.3 |
| selectivity based on butane mol % | | | | |
| Maleic anhydride | 22.3 | 14.6 | 12.1 | 11.2 |
| Carbon monoxide | 49.7 | 40.1 | 43.6 | 50.0 |
| Carbon dioxide | 27.9 | 34/8 | 45.4 | 42.2 |

EXAMPLE 41

In this Example a Fe-Mo-DBH catalyst was used for conversion of p-methylanisole. The Fe-Mo-DBH catalyst employed in Example 3 (0.52 g) was loaded into the micro-reactor equipped with an on-line GC, and heated to 300° C. under a flow of 6% $O_2$ in He (50 mL/min). Once the reactor reached to 300° C., p-methylanisole was introduced into the reactor by a syringe pump at a rate of 0.2 g/hr. Oxidation of p-methylanisole was carried out under conditions used in Example 3. Results show that selectivity of p-anisaldehyde and $CO_2$ were, respectively, 81% and 15% at p-methylanisole conversion of 27%. Both conversion and selectivity were calculated based on the area of GC peaks.

EXAMPLE 42

In this Example a Fe-Mo-DBH catalyst was used for conversion of 4-ethyltoluene. A Fe-Mo-DBH catalyst containing 5.6 wt % Mo,. 1.16 wt % Fe and 720 ppm B (Mo/Fe=1.76), was prepared by the chemical vapor deposition method. Catalyst calcined at 650° C. was loaded into a quartz reactor, and oxidation of 4-ethyltoluene was carried out using two gas streams consisting of 0.16 vol % ethylbenzene (3.5 g/hr), 5.5 vol % $O_2$, and 20 vol % $N_2$ in either He or $CO_2$ at temperature varying from 350° C. to 400° C. Reactor effluent was analyzed by GC attached to the reactor and products were analyzed by means of GC/MS. Results in He at 375° C. showed that 4-ethyltoluene conversion was 39% with 17.2 mol % TAL selectivity, and 23 mol % selectivity to p-toluic acid, but in $CO_2$, conversion of 4-ethyltoluene was 69.9% with 20 mol % TAL selectivity and selectivity to p-toluic acid was increased to 34.8 mol %.

EXAMPLES 43 AND 44

Fe-Mo-DBH was made according to the CVD procedure of Example 2. It was analyzed and contained 2.57 wt % Fe 7.7 wt % Mo, and 660 ppm B (Mo/Fe=2.3) and surface area of 245 $m^2$/g. Fe-Mo-DBH catalyst (10 g) was tested at varying temperatures for oxidation of styrene; first in a stream of 0.15 vol % styrene, 4.2 vol % $O_2$, 15.4 vol % $N_2$, and balance He; and then under the same conditions in a stream of 0.16 vol % styrene, 5.0 vol % $O_2$, 18.5 vol % $N_2$, and balance $CO_2$. Results are shown, respectively, in Table 28 and Table 29 below.

TABLE 28

Oxidation of Styrene Over Fe—Mo—DBH with $O_2$ in He

| | Temp., °C. | | | |
|---|---|---|---|---|
| | 275 | 300 | 325 | 350 |
| Styrene Conv., % | 20.8 | 42.8 | 71.0 | 94.5 |
| Selectivities, % | | | | |
| Benzoic acid | 49.3 | 51.2 | 56.5 | 43.5 |
| Benzaldehyde | 21.6 | 21.3 | 19.0 | 19.0 |
| PNAA[1] | 4.6 | 2.5 | 1.0 | 0.2 |
| PCPN[2] | 7.4 | 6.4 | 3.4 | 1.1 |
| MAN[3] | 1.5 | 1.9 | 3.3 | 11.1 |
| CO | 6.5 | 7.4 | 6.9 | 9.6 |
| $CO_2$ | 9.1 | 9.4 | 9.7 | 15.5 |

[1]PNAA is phenylacetaldehyde
[2]PCPN is acetophenon
[3]MAN is maleic anhydride

TABLE 29

Oxidation of Styrene Over Fe—Mo—DBH with $O_2$ in $CO_2$

| | Temp., °C. | | | | |
|---|---|---|---|---|---|
| | 250 | 275 | 300 | 325 | 350 |
| Styrene Conv., % | 6.2 | 16.0 | 31.0 | 50.6 | 90.4 |
| Selectivities, % | | | | | |
| Benzoic acid | 42.6 | 51.3 | 59.4 | 63.7 | 62.2 |
| Benzaldehyde | 33.6 | 26.5 | 22.7 | 21.0 | 21.4 |
| PNAA[1] | 10.6 | 5.7 | 3.1 | 1.5 | 0.4 |
| PCPN[2] | 13.3 | 10.4 | 7.3 | 4.3 | 1.8 |
| MAN[3] | 0 | 0 | 1.8 | 2.8 | 7.3 |
| CO | 0 | 6.1 | 5.8 | 6.6 | 6.6 |

[1]PNAA is phenylacetaldehyde
[2]PCPN is acetophenon
[3]MAN is maleic anhydride

That which is claimed is:

1. A composition comprising a minor amount of a material consisting of a first component which is a compound of an element selected from the group consisting of Fe(III), Zn(II), Zr(IV), Nb(V), In(III), Sn(IV), Sb(V), Ce(III) and Bi(III), and a second component which is a compound of an element selected from the group consisting of V(V), Mo(VI) and W(VI), which first and second components are interactively distributed on a major amount of deboronated HAMS-1B crystalline borosilicate molecular sieve containing less than about 0.1 weight percent as the element of boron.

2. The composition of claim 1 wherein the total metals in the minor amount of material is in a range form about 0.5 to about 15 weight percent of the total weight of the composition.

3. The composition of claim 2 wherein the minor amount of a material consisting of a first component which is a compound of an element selected from the group consisting of Fe(III), Zn(II), Sb(V), and Bi(III), and a second component which is a compound of an element selected from the group consisting of Mo(VI) and W(VI).

4. The composition of claim 2 wherein the first component is a compound of Fe(III) and the second component is a compound of Mo(VI), and the minor amount of iron-molybdenum material having a molybdenum to iron ratio in a range from about 1.5 to about 2.5 distributed on a major amount of deboronated HAMS-1B crystalline borosilicate molecular sieve containing less than about 0.1 weight percent as the element of boron.

5. The composition of claim 2 made by a process comprising:
depositing a volatile iron compound on a HAMS-1B crystalline borosilicate molecular sieve containing at least about 0.4 weight percent as the element of boron or a predeboronated HAMS-1B crystalline borosilicate molecular sieve containing less than about 0.1 weight percent of boron as the element from the vapor phase to form an iron-containing, deboronated HAMS-1B crystalline borosilicate molecular sieve;
washing and drying said iron-containing deboronated HAMS-1B crystalline borosilicate molecular sieve;
depositing a volatile molybdenum compound on said washed and dried iron-containing deboronated HAMS-1B crystalline borosilicate molecular sieve from the vapor phase to form an iron-molybdenum-containing deboronated HAMS-1B crystalline borosilicate molecular sieve; and
heating said iron-molybdenum-containing deboronated HAMS-1B crystalline borosilicate molecular sieve to form a composition comprising a minor amount of an iron molybdenum material having a molybdenum to iron ratio between about 1.5 and about 2.5 distributed on a major amount of deboronated HAMS-1B crystalline borosilicate molecular sieve containing less than about 0.1 weight percent as the element of boron.

* * * * *

UNITED STATES PATENT AND TRADEMARK OFFICE
CERTIFICATE OF CORRECTION

PATENT NO. : 5,324,702
DATED : June 28, 1994
INVENTOR(S) : Yoo et al.

It is certified that error appears in the above-indentified patent and that said Letters Patent is hereby corrected as shown below:

Column   Line 19   44   "p-xylene over Fe-Mcatalyscatalyst." should read --p-xylene over Fe-Mo-DBH catalyst.--

24   54   "using 0.5 g of $Fe_2(-MoO_4)_3$" should read --using 0.5 g of $Fe_2(MoO_4)_3$--

26   6    "mixture of benzene and $N_2$ was passed" should read --mixture of benzene and $N_2O$ was passed--

27   24   "1.15 wt % Fe (Mo/-Fe=3.5)." should read --1.15 wt % Fe (Mo/Fe=3.5).--

Signed and Sealed this

Twenty-seventh Day of February, 1996

Attest:

BRUCE LEHMAN

Attesting Officer        Commissioner of Patents and Trademarks